United States Patent
Maeda (10) Patent No.: US 9,401,672 B2
(45) Date of Patent: Jul. 26, 2016

(54) BRUSHLESS MOTOR DRIVING CIRCUIT AND BRUSHLESS MOTOR DRIVING SYSTEM

(71) Applicant: Kabushiki Kaisha Toshiba, Minato-ku, Tokyo (JP)

(72) Inventor: Minoru Maeda, Chigasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/644,609

(22) Filed: Mar. 11, 2015

(65) Prior Publication Data

US 2015/0349680 A1 Dec. 3, 2015

(30) Foreign Application Priority Data

May 30, 2014 (JP) .................................. 2014-113223

(51) Int. Cl.
*H02P 6/00* (2016.01)
*H02P 6/08* (2016.01)

(52) U.S. Cl.
CPC ........................................ *H02P 6/08* (2013.01)

(58) Field of Classification Search
CPC ............... H02P 6/14; H02P 6/08; H02P 6/16; H02K 29/12; H02K 29/08; H02K 29/10
USPC ............... 318/400.01, 400.37, 400.39, 400.4, 318/911, 599
See application file for complete search history.

(56) References Cited

U.S. PATENT DOCUMENTS

| 5,023,527 A * | 6/1991 | Erdman ................... F23N 3/082 318/400.03 |
| 5,929,577 A * | 7/1999 | Neidorff ................. H02P 6/182 318/400.24 |
| 6,271,641 B1 * | 8/2001 | Yasohara .................. H02P 8/34 318/567 |
| 7,791,309 B2 * | 9/2010 | Hwang ..................... H02P 6/20 318/430 |
| 8,710,778 B2 * | 4/2014 | Clothier .................... A47L 5/26 318/400.13 |
| 2012/0032621 A1 | 2/2012 | Asukai | |

FOREIGN PATENT DOCUMENTS

JP 2012-039784 A 2/2012

* cited by examiner

*Primary Examiner* — Rina Duda
(74) *Attorney, Agent, or Firm* — White & Case LLP (57) ABSTRACT

The brushless motor driving circuit includes a peak hold circuit that outputs a second voltage obtained by holding a peak of a first voltage that is based on a detected voltage responsive to a voltage drop in the detecting resistor. The brushless motor driving circuit includes a filter circuit that outputs a third voltage, which is a direct-current component of the second voltage. The brushless motor driving circuit includes a differential voltage detecting circuit that outputs a first differential voltage between the second voltage and the third voltage. The brushless motor driving circuit includes a computing circuit that calculates a second differential voltage between the analog voltage and a fourth voltage responsive to the first differential voltage, and outputs a speed control signal responsive to the second differential voltage.

20 Claims, 5 Drawing Sheets

BRUSHLESS MOTOR DRIVING CIRCUIT AND BRUSHLESS MOTOR DRIVING SYSTEM

CROSS-REFERENCE TO RELATED APPLICATION

This application is based upon and claims the benefit of priority from the prior Japanese Patent Application No. 2014-113223, filed on May 30, 2014, the entire contents of which are incorporated herein by reference.

BACKGROUND

1. Field

Embodiments described herein relate generally to a brushless motor driving circuit and a brushless motor driving system.

2. Background Art

A conventional brushless motor driving circuit has a driver circuit that controls rotation of a three-phase brushless motor at a time of energization in response to a speed instruction. In the control by the brushless motor driving circuit, a rotation fluctuation of the three-phase brushless motor can occur.

DETAILED DESCRIPTION

A brushless motor driving system according to an embodiment includes a brushless motor. The brushless motor driving system includes a power device that is connected between a power supply voltage and a ground and supplies the power supply voltage to the brushless motor in the form of a sinusoidal wave signal. The brushless motor driving system includes a brushless motor driving circuit that controls the power device. The brushless motor driving system includes a detecting resistor to which a motor current flowing through the brushless motor flows via the power device.

The brushless motor driving circuit includes a peak hold circuit that outputs a second voltage obtained by holding a peak of a first voltage that is based on a detected voltage responsive to a voltage drop in the detecting resistor. The brushless motor driving circuit includes a filter circuit that outputs a third voltage, which is a direct-current component of the second voltage. The brushless motor driving circuit includes a differential voltage detecting circuit that outputs a first differential voltage between the second voltage and the third voltage. The brushless motor driving circuit includes an integrating amplifier circuit that converts a speed instruction pulse signal that is a pulse wave responsive to a rotational speed of the brushless motor into an analog voltage. The brushless motor driving circuit includes a computing circuit that calculates a second differential voltage between the analog voltage and a fourth voltage responsive to the first differential voltage, and outputs a speed control signal responsive to the second differential voltage. The brushless motor driving circuit includes an output waveform generating circuit that generates a driving signal for driving the brushless motor based on an energization timing and the speed control signal.

In the following, an embodiment will be described with reference to the drawings.

First Embodiment

Figure 1:
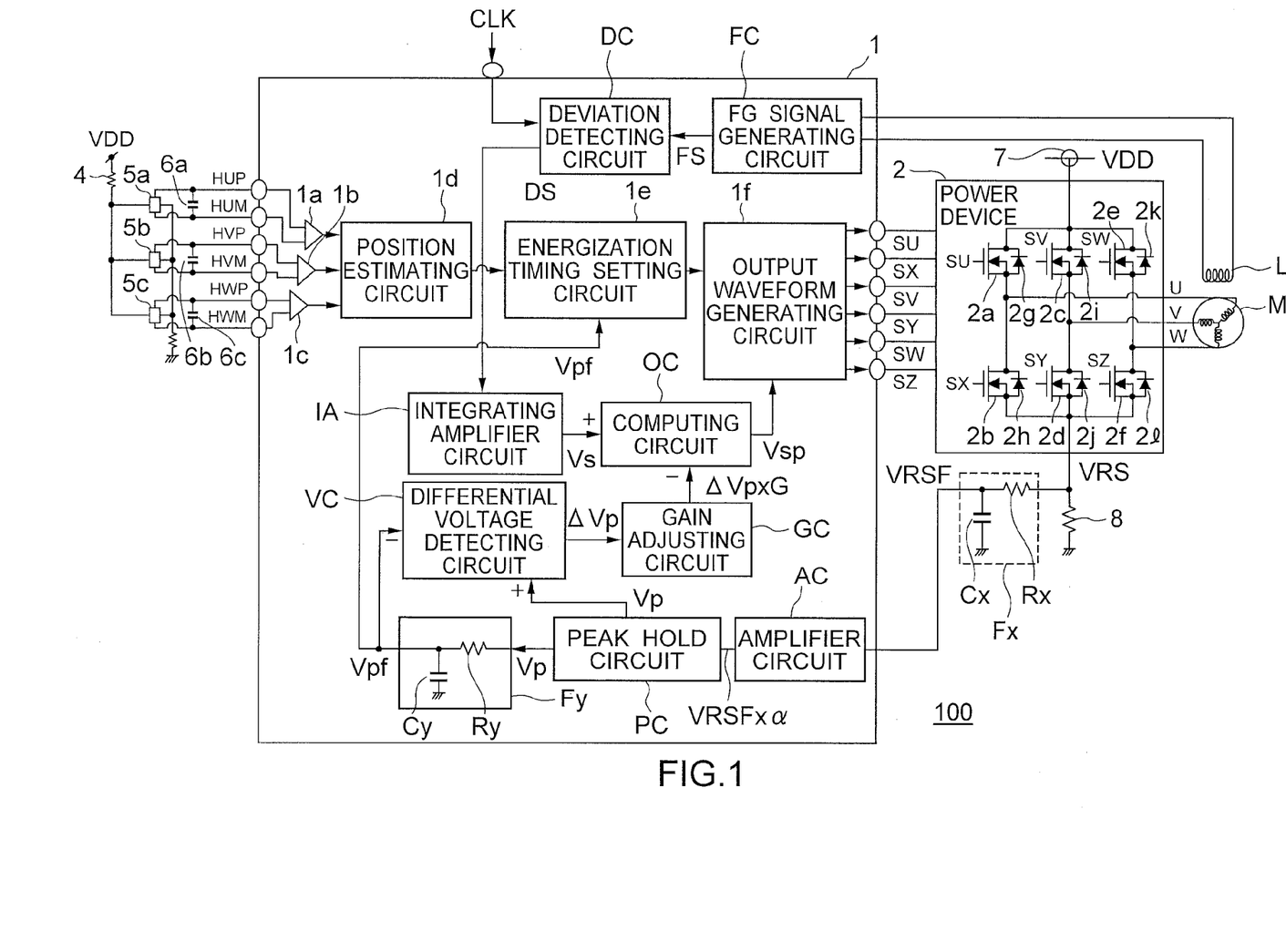
FIG. 1 is a diagram showing an example of a configuration of a brushless motor driving system 100 according to a first embodiment.
Figure 2:
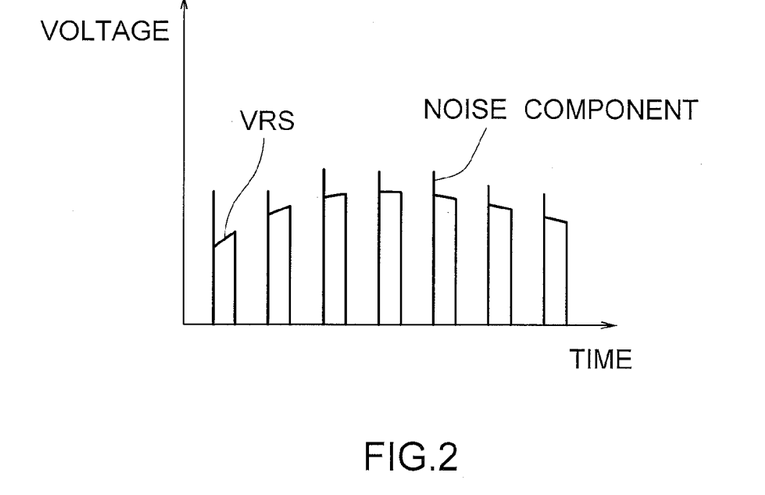
FIG. 2 is a graph showing an example of a waveform of a detected voltage "VRS", which is a voltage detected by a detecting resistor 8 shown in FIG. 1.
Figure 3:
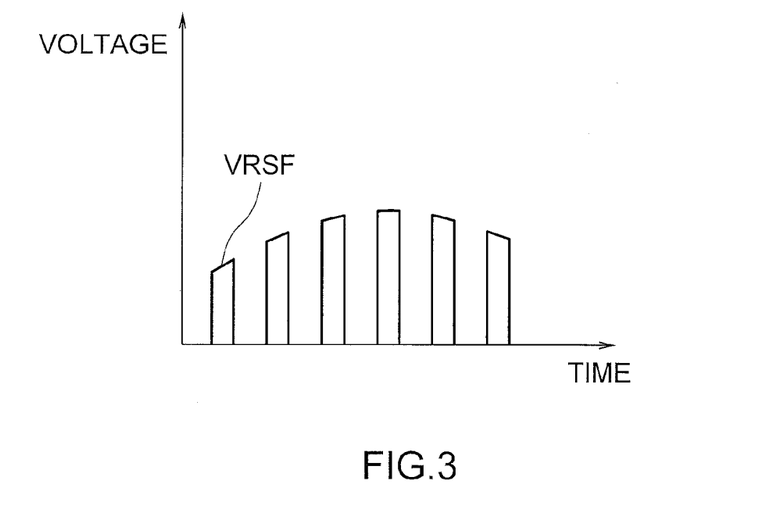
FIG. 3 is a graph showing an example of a waveform of a filtered detected voltage "VRSF", which is the detected voltage "VRS" filtered by a filter circuit "Fx" shown in FIG. 1.
Figure 4:
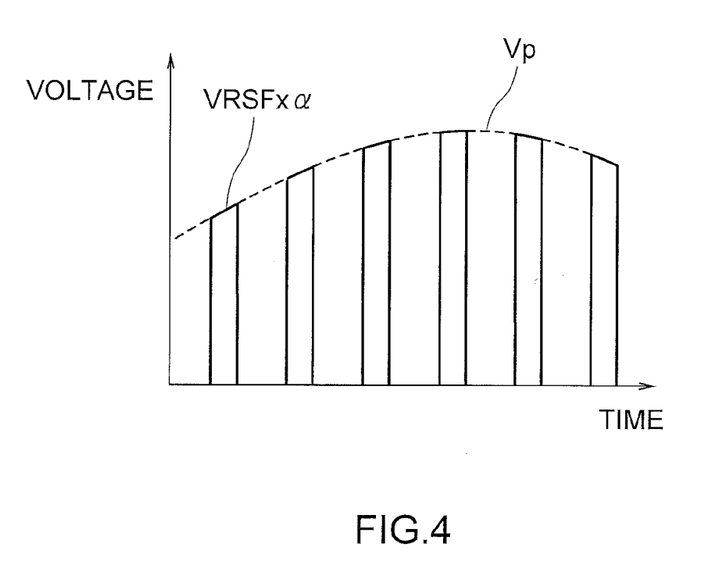
FIG. 4 is a graph showing an example of a waveform of an amplified voltage "VRSF×α", which is the filtered detected voltage "VRSF" amplified by an amplifier circuit "AC" shown in FIG. 1.
Figure 5:
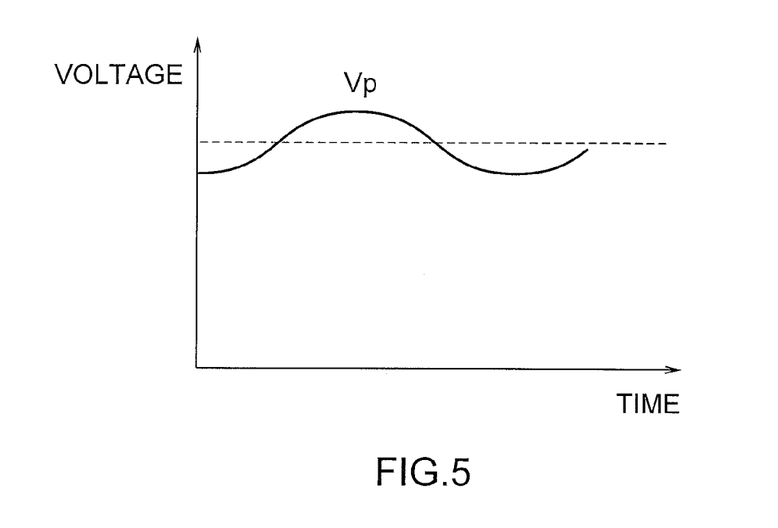
FIG. 5 is a graph showing an example of a waveform of a second voltage "Vp" held by a peak hold circuit "PC" shown in FIG. 1.
Figure 6:
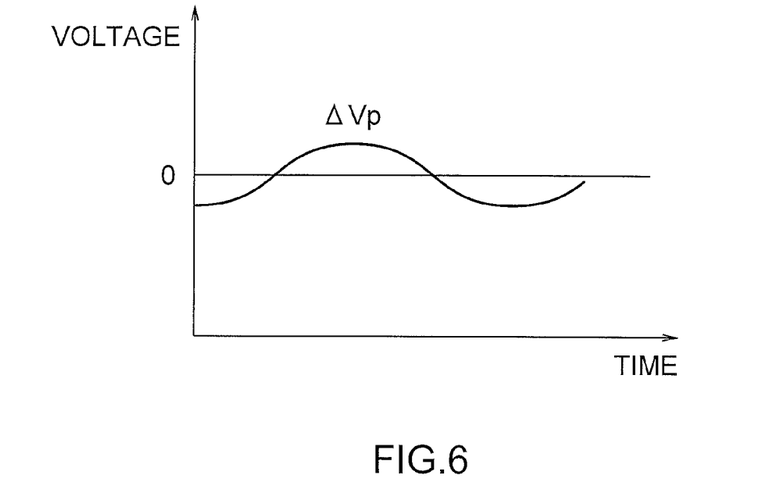
FIG. 6 is a graph showing an example of a waveform of a differential voltage "ΔVp" detected by a differential voltage detecting circuit "VC" shown in FIG. 1.

FIG. 1 is a diagram showing an example of a configuration of a brushless motor driving system 100 according to a first embodiment. FIG. 2 is a graph showing an example of a waveform of a detected voltage "VRS", which is a voltage detected by a detecting resistor 8 shown in FIG. 1. FIG. 3 is a graph showing an example of a waveform of a filtered detected voltage "VRSF", which is the detected voltage "VRS" filtered by a filter circuit "Fx" shown in FIG. 1. FIG. 4 is a graph showing an example of a waveform of an amplified voltage "VRSF×α", which is the filtered detected voltage "VRSF" amplified by an amplifier circuit "AC" shown in FIG. 1. FIG. 5 is a graph showing an example of a waveform of a second voltage "Vp" held by a peak hold circuit "PC" shown in FIG. 1. FIG. 6 is a graph showing an example of a waveform of a differential voltage "ΔVp" detected by a differential voltage detecting circuit "VC" shown in FIG. 1.

As shown in FIG. 1, the brushless motor driving system 100 includes a three-phase brushless motor "M", first to third Hall devices 5a to 5c, first to third capacitors 6a to 6c, a brushless motor driving circuit 1, a power device 2, the detecting resistor 8, a noise filter circuit "Fx", and a detecting coil "L".

The first to third Hall devices 5a to 5c are attached to coils of different phases (U-phase, V-phase, and W-phase) of the three-phase brushless motor "M". The first Hall device 5a outputs U-phase Hall signals "HUP" and "HUM" to the brushless motor driving circuit 1, the second Hall device 5b outputs V-phase Hall signals "HVP" and "HVM" to the brushless motor driving circuit 1, and the third Hall device 5c outputs W-phase Hall signals "HWP" and "HWM" to the brushless motor driving circuit 1. The signals "HUM", "HVM" and "HWM" are inverted signals of the signals "HUP", "HVP" and "HWP".

The first to third capacitors 6a to 6c are connected to outputs of the first to third Hall devices 5a to 5c, respectively.

The detecting coil "L" is disposed close to the three-phase brushless motor "M", and an exciting current responsive to the rotational speed of the three-phase brushless motor "M" flows through the detecting coil "L". A signal based on the exciting current flowing through the detecting coil "L" is supplied to the brushless motor driving circuit 1.

A power supply 7 outputs a voltage "VDD".

The power device 2 is connected between the power supply 7 that generates the power supply voltage "VDD" and a ground. In particular, as shown in FIG. 1, the power device 2 is connected to the power supply 7 at one end thereof and to the ground via the resistor 8 at another end thereof.

As shown in FIG. 1, the power device 2 supplies the power supply voltage "VDD" to the three-phase brushless motor "M" in the form of sinusoidal wave signals "U", "V" and "W" of three different phases in response to driving signals "SU", "SX", "SV", "SY", "SW" and "SZ", for example.

The power device 2 has six nMOS transistors $2a$ to $2f$ and six diodes $2g$ to $2l$.

The nMOS transistor $2a$ that receives the driving signal "SU" at a gate thereof and the nMOS transistor $2b$ that receives the driving signal "SX" at a gate thereof are connected in series with each other between the power supply 7 and the ground. A terminal between the nMOS transistors $2a$ and $2b$ is connected to the U-phase coil of the three-phase brushless motor "M". The sinusoidal signal "U" is supplied to the U-phase coil via this terminal.

The diode $2g$ is connected to a drain of the nMOS transistor $2a$ at a cathode thereof and to a source of the nMOS transistor $2a$ at an anode thereof. The diode $2h$ is connected to a drain of the nMOS transistor $2b$ at a cathode thereof and to a source of the nMOS transistor $2b$ at an anode thereof.

The nMOS transistor $2c$ that receives the driving signal "SV" at a gate thereof and the nMOS transistor $2d$ that receives the driving signal "SY" at a gate thereof are connected in series with each other between the power supply 7 and the ground. A terminal between the nMOS transistors $2c$ and $2d$ is connected to the V-phase coil of the three-phase brushless motor "M". The sinusoidal signal "V" is supplied to the V-phase coil via this terminal.

The diode $2i$ is connected to a drain of the nMOS transistor $2c$ at a cathode thereof and to a source of the nMOS transistor $2c$ at an anode thereof. The diode $2j$ is connected to a drain of the nMOS transistor $2d$ at a cathode thereof and to a source of the nMOS transistor $2d$ at an anode thereof.

The nMOS transistor $2e$ that receives the driving signal "SW" at a gate thereof and the nMOS transistor $2f$ that receives the driving signal "SZ" at a gate thereof are connected in series with each other between the power supply 7 and the ground. A terminal between the nMOS transistors $2e$ and $2f$ is connected to the W-phase coil of the three-phase brushless motor "M". The sinusoidal signal "W" is supplied to the W-phase coil via this terminal.

The diode $2k$ is connected to a drain of the nMOS transistor $2e$ at a cathode thereof and to a source of the nMOS transistor $2e$ at an anode thereof. The diode $2l$ is connected to a drain of the nMOS transistor $2f$ at a cathode thereof and to a source of the nMOS transistor $2f$ at an anode thereof.

The sinusoidal wave signals "U", "V" and "W" of three different phases cause a current to pass through the coils of three different phases of the three-phase brushless motor "M", thereby driving the three-phase brushless motor "Ni".

The detecting resistor 8 is connected to another end of the power device 2 at one end thereof and to the ground at another end thereof. A motor current flowing through the three-phase brushless motor "M" flows to the detecting resistor 8 through the power device 2.

The detected voltage "VRS" is a voltage detected by the detecting resistor 8 based on a voltage drop caused by the motor current flowing through the detecting resistor 8. In this example, the detected voltage "VRS" (FIG. 2) is output at the one end of the detecting resistor 8.

The noise filter circuit "Fx" filters out a voltage noise in the detected voltage "VRS". The filtered detected voltage "VRSF" (FIG. 3) from which the voltage noise has been filtered out is supplied to the brushless motor driving circuit 1. The noise filter circuit "Fx" may be omitted or incorporated in the brushless motor driving circuit 1 as required.

As shown in FIG. 1, the noise filter circuit "Fx" includes a filtering resistor "Rx" and a filtering capacitor "Cx", for example.

The filtering resistor "Rx" is connected to the one end of the detecting resistor 8 at one end thereof and to an input of the amplifier circuit "AC" at another end thereof (the voltage at this another end is the filtered detected voltage "VRSF").

The filtering capacitor "Cx" is connected to another end of the filtering resistor "Rx" at one end thereof and to the ground at another end thereof.

The brushless motor driving circuit 1 controls the power device 2 (the brushless motor driving circuit 1 controls driving of the three-phase brushless motor "M" by the sinusoidal wave signals "U", "V" and "W" of three different phases).

As shown in FIG. 1, the brushless motor driving circuit 1 includes first to third amplifier circuits $1a$ to $1c$, a position estimating circuit $1d$, an energization timing setting circuit $1e$, an output waveform generating circuit $1f$, the amplifier circuit "AC", the peak hold circuit "PC", a smoothing filter circuit "Fy", the differential voltage detecting circuit "VC", an integrating amplifier circuit "IA", a computing circuit "OC", a gain adjusting circuit "GC", an FG signal generating circuit "FC", and a deviation detecting circuit "DC", for example.

The first amplifier circuit $1a$ amplifies the difference between the U-phase Hall signals "HUP" and "HUM" and outputs the resulting signal, the second amplifier circuit $1b$ amplifies the difference between the V-phase Hall signals "HVP" and "HVM" and outputs the resulting signal, and the third amplifier circuit $1c$ amplifies the difference between the W-phase Hall signals "HWP" and "HWM" and outputs the resulting signal.

The position estimating circuit $1d$ estimates the phase of the three-phase brushless motor "M" (position of a rotor) based on the output signals of the first to third amplifier circuits $1a$ to $1c$, and outputs a signal based on the result of the estimation. The energization timing setting circuit $1e$ sets an energization timing for the three-phase brushless motor "M" based on the phase of the three-phase brushless motor "M" estimated by the position estimating circuit $1d$.

The energization timing setting circuit $1e$ adjusts an advance angle value or lag angle value of the timing of energization of the three-phase brushless motor "M" by the power device 2, in accordance with a third voltage "Vpf".

The amplifier circuit "AC" amplifies the filtered detected voltage "VRSF" (or the detected voltage "VRS" if the noise filter circuit "Fx" is omitted) with an amplification factor α and outputs the resulting voltage as a first voltage (voltage "VRSF"×amplifier factor α) (FIG. 4).

The peak hold circuit "PC" outputs a second voltage "Vp" obtained by holding a peak of the first voltage that is based on the voltage "VRS" detected based on the voltage drop in the detecting resistor 8.

In the example shown in FIG. 1, the peak hold circuit "PC" outputs the second voltage "Vp" (FIGS. 4 and 5) obtained by holding a peak of the first voltage (voltage "VRSF"×amplifier factor α) output from the amplifier circuit "AC". Alternatively, the peak hold circuit "PC" may output a second voltage "Vp" obtained by holding a peal of the first voltage that is based on the filtered detected voltage "VRSF" output from the noise filter circuit "Fx".

The smoothing filter circuit "Fy" smoothes the second voltage "Vp" and outputs the third voltage "Vpf", which is a direct-current component of the smoothed second voltage "Vp".

As shown in FIG. 1, the smoothing filter circuit "Fy" includes a smoothing resistor "Ry" and a smoothing capacitor "Cy", for example.

The smoothing resistor "Ry" receives the second voltage "Vp" at one end thereof and outputs the third voltage "Vpf" at another end thereof.

The smoothing capacitor "Cy" is connected to another end of the smoothing resistor "Ry" at one end thereof and to the ground at another end thereof (the voltage at this another end is a filtered detected voltage "Vpf").

The differential voltage detecting circuit "VC" outputs a differential voltage ΔVp (FIG. 6) obtained by subtracting the third voltage "Vpf", which is a direct-current component of the second voltage "Vp", from the second voltage "Vp".

That is, the differential voltage ΔVp is expressed by the following formula (1), for example.

$$\Delta Vp = Vp - Vpf \qquad (1)$$

The gain adjusting circuit "GC" adjusts a gain "G" of the differential voltage ΔVp output from the differential voltage detecting circuit "VC" and outputs the resulting voltage as a fourth voltage (differential voltage ΔVp×gain "G"). The gain adjusting circuit "GC" may be omitted as required.

The FG signal generating circuit "FC" generates a frequency generation (FG) signal "FS" having a pulse wave based on a frequency of the exciting current flowing through the detecting coil "L".

As described above, the exciting current flows through the detecting coil "L" in accordance with the rotational speed of the three-phase brushless motor "M". In other words, the FG signal "FS" is a pulse wave based on the frequency responsive to the rotational speed of the three-phase brushless motor "M".

The deviation detecting circuit "DC" detects a deviation between the FG signal "FS" and a reference clock signal "CLK" input thereto from the outside, and outputs a speed instruction pulse signal "DS" having a pulse wave responsive to the deviation. More specifically, the deviation detecting circuit "DC" detects a frequency deviation or phase deviation and outputs the speed instruction pulse signal "DS" having a pulse wave responsive to the frequency deviation or phase deviation.

In other words, the speed instruction pulse signal "DS" is a pulse wave based on the rotational speed (frequency or phase) of the three-phase brushless motor "M".

For example, the speed instruction pulse signal "DS" instructs to accelerate the three-phase brushless motor "M" when the period of the FG signal "FS" is longer than the period of the reference clock signal "CLK". On the other hand, the speed instruction pulse signal "DS" instructs to decelerate the three-phase brushless motor "M" when the period of the FG signal "FS" is shorter than the period of the reference clock signal "CLK".

Alternatively, for example, the speed instruction pulse signal "DS" instructs to accelerate the three-phase brushless motor "M" when the phase of the FG signal "FS" lags behind the phase of the reference clock signal "CLK". On the other hand, the speed instruction pulse signal "DS" instructs to decelerate the three-phase brushless motor "M" when the phase of the FG signal "FS" leads the phase of the reference clock signal "CLK".

The integrating amplifier circuit "IA" converts the speed instruction pulse signal "DS" that is a pulse wave based on the rotational speed of the three-phase brushless motor "M" into an analog voltage "Vs". That is, the analog voltage "Vs" contains information concerning the instruction (such as acceleration or deceleration) about the speed of the three-phase brushless motor "M". The analog voltage "Vs" has an upper limit value from the viewpoint of circuit design, and the speed (maximum torque) that can be set also has an upper limit.

The computing circuit "OC" calculates the difference between the analog voltage "Vs" and the fourth voltage based on the differential voltage "ΔVp" (differential voltage "ΔVp"×gain "G"), and outputs a speed control signal "Vsp" responsive to the result of the calculation.

That is, in this embodiment, the speed control signal "Vsp" is expressed by the following formula (2).

$$Vsp = Vs - \Delta Vp \times G \qquad (2)$$

Thus, the speed control signal "Vsp" is a signal obtained by correcting the analog voltage "Vs" responsive to the speed instruction pulse signal "DS" that designates the speed of the three-phase brushless motor "M" with the differential voltage "ΔVp" (×amplification factor α) based on the motor current.

The output waveform generating circuit 1f outputs the driving signals "SU", "SX", "SV", "SY", "SW" and "SZ" for driving the three-phase brushless motor "M" based on the energization timing set by the energization timing setting circuit 1e and the speed control signal "Vsp".

For example, the speed of the three-phase brushless motor "M" is controlled by controlling the duty cycle, the advance angle value, the lag angle value or the like of the driving signals "SU", "SX", "SV", "SY", "SW" and "SZ" based on the speed control signal "Vsp".

Next, characteristics of the brushless motor driving system 100 configured as described above will be described.

Figure 7:
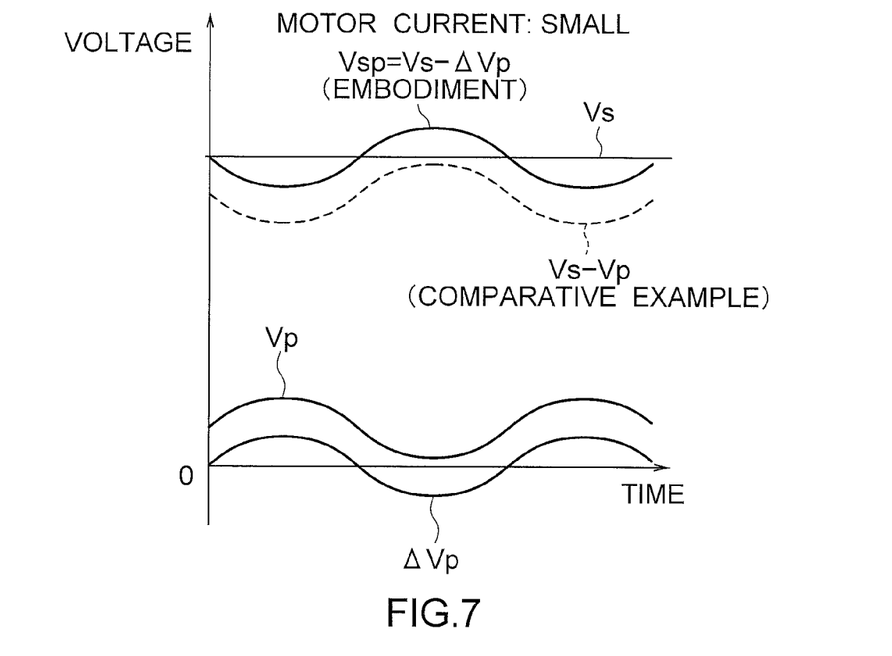
FIG. 7 is a graph showing an example of waveforms of the speed control signal "Vsp", the analog voltage "Vs", the second voltage "Vp" and the differential voltage "ΔVp" in the case where the motor current is small.
Figure 8:
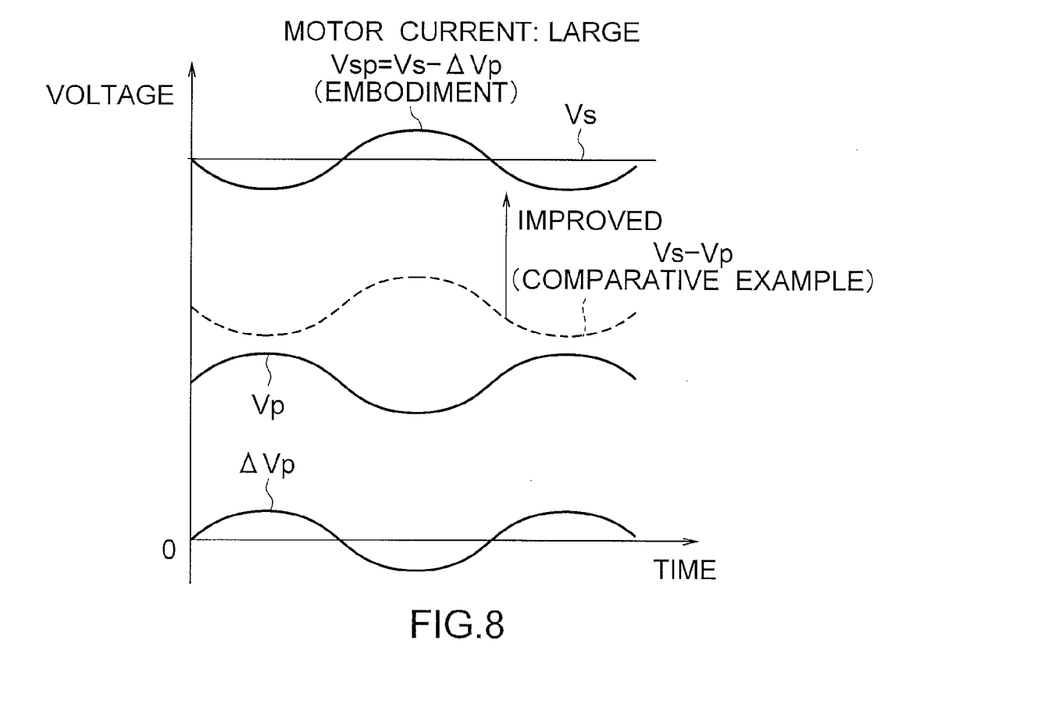
FIG. 8 is a graph showing an example of waveforms of the speed control signal "Vsp", the analog voltage "Vs", the second voltage "Vp" and the differential voltage "ΔVp" in the case where the motor current is large.

FIG. 7 is a graph showing an example of waveforms of the speed control signal "Vsp", the analog voltage "Vs", the second voltage "Vp" and the differential voltage "ΔVp" in the case where the motor current is small. FIG. 8 is a graph showing an example of waveforms of the speed control signal "Vsp", the analog voltage "Vs", the second voltage "Vp" and the differential voltage "ΔVp" in the case where the motor current is large. In FIGS. 7 and 8, as a comparative example, the difference between the analog voltage "Vs" and the second voltage "Vp" is also shown. In the examples shown in FIGS. 7 and 8, for the sake of simplicity, the gain "G" is set at 1. In the examples shown in FIGS. 7 and 8, the same load is exerted on the three-phase brushless motor "M".

As shown in FIG. 7, for example, when the motor current is small, that is, when the rotation torque of the three-phase brushless motor "M" is small, the second voltage "Vp" responsive to the motor current (detected voltage "VRS") is low. In this case, the analog voltage "Vs" that designates the speed of the three-phase brushless motor "M" is set at a low value.

As described above, the differential voltage "ΔVp" is a value obtained by subtracting the third voltage "Vpf", which is a direct-current component of the second voltage "Vp", from the second voltage "Vp" and therefore is an alternating-current component of the second voltage "Vp". Therefore, the speed control signal "Vsp" assumes a value close to the analog voltage "Vs".

The analog signal "Vs" minus the second voltage "Vp" (comparative example) is slightly lower than the analog voltage "Vs".

As described above, when the motor current is small, the speed control signal "Vsp" varies within a range with respect to the analog voltage "Vs", so that the output waveform generating circuit 1f can control the duty cycles of the driving signals "SU", "SX", "SV", "SY", "SW" and "SZ" to a predetermined value in accordance with the speed control signal "Vsp".

On the other hand, as shown in FIG. 8, when the motor current is large, that is, when the rotation torque of the three-phase brushless motor "M" is large, the second voltage "Vp" responsive to the motor current (detected voltage "VRS") is high. In this case, the analog voltage "Vs" that designates the speed of the three-phase brushless motor "M" is set at a high value.

In this case where the motor current is large, again, the differential voltage "ΔVp" is a value obtained by subtracting the third voltage "Vpf", which is a direct-current component of the second voltage "Vp", from the second voltage "Vp" and therefore is an alternating-current component of the second voltage "Vp". Therefore, in the case where the motor current is large, again, the speed control signal "Vsp" assumes a value close to the analog voltage "Vs".

To the contrary, the value in the comparative example (the analog voltage "Vs" minus the second voltage "Vp") substantially differs from the analog voltage "Vs". For example, if the output waveform generating circuit 1f controls the driving signals based on the value in the comparative example, the magnitude of the motor current has a greater effect on the control of the driving signals and therefore can cause a fluctuation of the rotation of the three-phase brushless motor.

According to this embodiment, however, when the motor current is large, the speed control signal "Vsp" varies within a range with respect to the analog voltage "Vs", so that the output waveform generating circuit 1f can control the duty cycles of the driving signals "SU", "SX", "SV", "SY", "SW" and "SZ" to a predetermined value in accordance with the speed control signal "Vsp".

That is, since only the variation of the amount of the motor current is fed back in the brushless motor driving circuit 1, a rotation fluctuation of the three-phase brushless motor "M" can be reduced without decreasing the maximum torque of the three-phase brushless motor "M".

In addition, since the brushless motor driving circuit 1 uses the third voltage "Vpf", which is advance angle data, as a direct-current component of the current variation, no additional circuit is required.

As described above, the brushless motor driving circuit according to this embodiment can reduce the rotation fluctuation of the three-phase brushless motor.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A brushless motor driving system, comprising:
   a brushless motor;
   a power device that is connected between a power supply voltage and a ground, and supplies the power supply voltage to the brushless motor in the form of a sinusoidal wave signal;
   a brushless motor driving circuit that controls the power device; and
   a detecting resistor to which a motor current flowing through the brushless motor flows via the power device,
   wherein the brushless motor driving circuit comprises:
   a peak hold circuit that outputs a second voltage obtained by holding a peak of a first voltage that is based on a detected voltage responsive to a voltage drop in the detecting resistor;
   a filter circuit that outputs a third voltage, which is a direct-current component of the second voltage;
   a differential voltage detecting circuit that outputs a first differential voltage between the second voltage and the third voltage;
   an integrating amplifier circuit that converts a speed instruction pulse signal that is a pulse wave responsive to a rotational speed of the brushless motor into an analog voltage;
   a computing circuit that calculates a second differential voltage between the analog voltage and a fourth voltage responsive to the first differential voltage, and outputs a speed control signal responsive to the second differential voltage; and
   an output waveform generating circuit that generates a driving signal for driving the brushless motor based on an energization timing and the speed control signal.

2. The brushless motor driving system according to claim 1, wherein the brushless motor driving circuit further comprises:
   a gain adjusting circuit that outputs the fourth voltage adjusted a gain of the first differential voltage.

3. The brushless motor driving system according to claim 1, wherein the brushless motor driving circuit further comprises:
   a noise filter circuit that filters out a voltage noise in the detected voltage.

4. The brushless motor driving system according to claim 1, wherein the brushless motor driving circuit further comprises:
   an amplifier circuit that outputs the first voltage amplified the detected voltage.

5. The brushless motor driving system according to claim 1, further comprising an energization timing setting circuit that outputs the energization timing of the brushless motor,
   wherein the energization timing setting circuit adjusts an advance angle value or lag angle value of the energization timing of the brushless motor by the power device.

6. The brushless motor driving system according to claim 1, wherein the power device is connected to the power supply at a first end thereof, and
   the detecting resistor is connected to a second end of the power device at a first end thereof and to the ground at a second end thereof.

7. The brushless motor driving system according to claim 1, further comprising:
   a detecting coil that is disposed close to the brushless motor and through which an exciting current responsive to the rotational speed of the brushless motor flows,
   wherein the brushless motor driving circuit further comprises:
   a frequency generation (FG) signal generating circuit that generates an FG signal having a pulse wave responsive to a frequency of the exciting current flowing through the detecting coil; and
   a deviation detecting circuit that detects a deviation between the FG signal and a reference clock signal and outputs a speed instruction pulse signal having a pulse wave responsive to the deviation.

8. The brushless motor driving system according to claim 7, wherein the deviation detecting circuit detects a frequency deviation or phase deviation, and outputs the speed instruction pulse signal having a pulse wave responsive to the frequency deviation or phase deviation.

9. The brushless motor driving system according to claim 8, wherein the speed instruction pulse signal
   instructs to accelerate the brushless motor when a period of the FG signal is longer than a period of the reference clock signal, and
   instructs to decelerate the brushless motor when the period of the FG signal is shorter than the period of the reference clock signal.

10. The brushless motor driving system according to claim 8, wherein the speed instruction pulse signal
    instructs to accelerate the brushless motor when a phase of the FG signal lags behind a phase of the reference clock signal, and
    instructs to decelerate the brushless motor when the phase of the FG signal leads the phase of the reference clock signal.

11. A brushless motor driving circuit controlling a power device that supplies a power supply voltage to a brushless motor in the form of a sinusoidal wave signal, the brushless motor driving circuit comprising:
    a peak hold circuit that outputs a second voltage obtained by holding a peak of a first voltage that is based on a detected voltage responsive to a voltage drop in a detecting resistor, a motor current flowing through the brushless motor and the motor current flowing to the detecting resistor via the power device;
    a filter circuit that outputs a third voltage, which is a direct-current component of the second voltage;
    a differential voltage detecting circuit that outputs a first differential voltage between the second voltage and the third voltage;
    an integrating amplifier circuit that converts a speed instruction pulse signal that is a pulse wave responsive to a rotational speed of the brushless motor into an analog voltage;
    a computing circuit that calculates a second differential voltage between the analog voltage and a fourth voltage responsive to the first differential voltage, and outputs a speed control signal responsive to the second differential voltage; and
    an output waveform generating circuit that generates a driving signal for driving the brushless motor based on an energization timing and the speed control signal.

12. The brushless motor driving circuit according to claim 11, wherein the brushless motor driving circuit further comprises:
    a gain adjusting circuit that outputs the fourth voltage adjusted a gain of the first differential voltage.

13. The brushless motor driving circuit according to claim 11, wherein the brushless motor driving circuit further comprises:
    a noise filter circuit that filters out a voltage noise in the detected voltage.

14. The brushless motor driving circuit according to claim 11, wherein the brushless motor driving circuit further comprises:
    an amplifier circuit that outputs the first voltage amplified the detected voltage.

15. The brushless motor driving circuit according to claim 11, further comprising an energization timing setting circuit that outputs the energization timing of the brushless motor,
    wherein the energization timing setting circuit adjusts an advance angle value or lag angle value of the energization timing of the brushless motor by the power device.

16. The brushless motor driving circuit according to claim 11, wherein the power device is connected to the power supply at a first end thereof, and
    the detecting resistor is connected to a second end of the power device at a first end thereof and to the ground at a second end thereof.

17. The brushless motor driving circuit according to claim 11, further comprising:
    a detecting coil that is disposed close to the brushless motor and through which an exciting current responsive to the rotational speed of the brushless motor flows,
    wherein the brushless motor driving circuit further comprises:
    a frequency generation (FG) signal generating circuit that generates an FG signal having a pulse wave responsive to a frequency of the exciting current flowing through the detecting coil; and
    a deviation detecting circuit that detects a deviation between the FG signal and a reference clock signal and outputs a speed instruction pulse signal having a pulse wave responsive to the deviation.

18. The brushless motor driving circuit according to claim 17, wherein the deviation detecting circuit detects a frequency deviation or phase deviation, and outputs the speed instruction pulse signal having a pulse wave responsive to the frequency deviation or phase deviation.

19. The brushless motor driving circuit according to claim 18, wherein the speed instruction pulse signal
    instructs to accelerate the brushless motor when a period of the FG signal is longer than a period of the reference clock signal, and
    instructs to decelerate the brushless motor when the period of the FG signal is shorter than the period of the reference clock signal.

20. The brushless motor driving circuit according to claim 18, wherein the speed instruction pulse signal
    instructs to accelerate the brushless motor when a phase of the FG signal lags behind a phase of the reference clock signal, and
    instructs to decelerate the brushless motor when the phase of the FG signal leads the phase of the reference clock signal.

* * * * *